(12) United States Patent
Takeda et al.

(10) Patent No.: US 11,444,676 B2
(45) Date of Patent: Sep. 13, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Chongning Na, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/958,452

(22) PCT Filed: Dec. 27, 2017

(86) PCT No.: PCT/JP2017/047135
§ 371 (c)(1),
(2) Date: Jun. 26, 2020

(87) PCT Pub. No.: WO2019/130523
PCT Pub. Date: Jul. 4, 2019

(65) Prior Publication Data
US 2021/0058129 A1 Feb. 25, 2021

(51) Int. Cl.
*H04B 7/06* (2006.01)
*H04W 76/19* (2018.01)
*H04W 36/30* (2009.01)
*H04W 16/28* (2009.01)
*H04W 28/02* (2009.01)
(Continued)

(52) U.S. Cl.
CPC ......... *H04B 7/0695* (2013.01); *H04B 7/0626* (2013.01); *H04W 16/28* (2013.01); *H04W 28/0278* (2013.01); *H04W 36/305* (2018.08); *H04W 52/365* (2013.01); *H04W 72/1268* (2013.01); *H04W 74/0833* (2013.01); *H04W 76/19* (2018.02)

(58) Field of Classification Search
CPC ............... H04W 76/19; H04W 52/365; H04W 28/0278; H04W 24/04; H04W 16/28; H04B 7/06; H04B 7/0626; H04B 7/0695
See application file for complete search history.

(56) References Cited

U.S. PATENT DOCUMENTS

2017/0170941 A1 6/2017 Yang et al.
2018/0367374 A1* 12/2018 Liu ...................... H04L 5/0053
(Continued)

FOREIGN PATENT DOCUMENTS

WO 2017204933 A1 11/2017

OTHER PUBLICATIONS

International Search Report issued in PCT/JP2017/047135 dated Apr. 3, 2018 (2 pages).
(Continued)

*Primary Examiner* — Gary Mui
(74) *Attorney, Agent, or Firm* — Osha Bergman Watanabe & Burton LLP

(57) ABSTRACT

To perform a beam failure recovery procedure by using an appropriate radio resource, a user terminal includes a transmitting section that transmits a beam failure recovery request, and a control section that controls transmission of the beam failure recovery request by using at least one of an uplink shared channel, an uplink control channel, a sounding reference signal, and a random access channel indicated by a downlink control channel.

4 Claims, 11 Drawing Sheets

(51) Int. Cl.
  *H04W 52/36* (2009.01)
  *H04W 72/12* (2009.01)
  *H04W 74/08* (2009.01)

(56) References Cited

U.S. PATENT DOCUMENTS

| | | | |
|---|---|---|---|
| 2018/0368126 A1* | 12/2018 | Islam | H04L 5/0048 |
| 2019/0058519 A1* | 2/2019 | Davydov | H04L 5/006 |
| 2019/0074882 A1* | 3/2019 | Zhou | H04W 72/046 |
| 2019/0074891 A1* | 3/2019 | Kwon | H04L 5/0023 |
| 2019/0081687 A1* | 3/2019 | Sadiq | H04W 76/19 |
| 2019/0089579 A1* | 3/2019 | Sang | H04W 76/27 |
| 2019/0090143 A1* | 3/2019 | Luo | H04B 7/0617 |
| 2019/0110281 A1* | 4/2019 | Zhou | H04B 7/088 |
| 2019/0190582 A1* | 6/2019 | Guo | H04B 7/0695 |
| 2019/0200248 A1* | 6/2019 | Basu Mallick | H04B 7/0695 |
| 2019/0229777 A1* | 7/2019 | Guan | H04W 72/12 |
| 2020/0059398 A1* | 2/2020 | Pan | H04W 72/0413 |
| 2020/0170065 A1* | 5/2020 | Xue | H04W 80/02 |
| 2020/0186218 A1* | 6/2020 | Wu | H04B 7/0632 |
| 2020/0244413 A1* | 7/2020 | Takeda | H04L 5/0048 |
| 2020/0322031 A1* | 10/2020 | You | H04L 5/001 |
| 2020/0322035 A1* | 10/2020 | Shi | H04B 7/0626 |
| 2020/0344834 A1* | 10/2020 | Harada | H04W 76/38 |
| 2020/0374960 A1* | 11/2020 | Deenoo | H04W 72/14 |
| 2020/0383165 A1* | 12/2020 | Takahashi | H04W 56/00 |
| 2020/0389220 A1* | 12/2020 | Kang | H04W 74/0833 |
| 2021/0058133 A1* | 2/2021 | Takeda | H04B 7/088 |
| 2021/0204346 A1* | 7/2021 | Ye | H04B 7/00 |

OTHER PUBLICATIONS

Written Opinion of the International Searching Authority issued in PCT/JP2017/047135 dated Apr. 3, 2018 (5 pages).
ZTE, Sanechips; "Discussion on beam recovery"; 3GPP TSG RAN WG1 Meeting #91, R1-1719534; Reno, USA; Nov. 27-Dec. 1, 2017 (10 pages).
Huawei, HiSilicon; "RLF for NR"; 3GPP TSG-RAN WG2#99bis, R2-1710560; Prague, Czech Republic; Aug. 9-13, 2017 (6 pages).
Vivo; "RACH configuration for beam recovery"; 3GPP TSG-RAN WG2 Meeting #100, R2-1712754; Reno, USA; Nov. 27-Dec. 1, 2017 (3 pages).
3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG-RAN WG2 Meeting #99bis; R2-1710920 "RACH configuration for beam recovery" vivo; Prague, Czech Republic; Oct. 9-13, 2017 (2 pages).
3GPP TSG RAN WG1 Meeting #90bis; R1-1717302 "Beam failure recovery design details" Huawei, HiSilicon; Prague, Czech Republic; Oct. 9-13, 2017 (7 pages).
Extended European Search Report issued in European Application No. 17936736.2, dated Jul. 5, 2021 (11 pages).
Office Action issued in Japanese Application No. 2019-561510; dated Feb. 22, 2022 (9 pages).

* cited by examiner

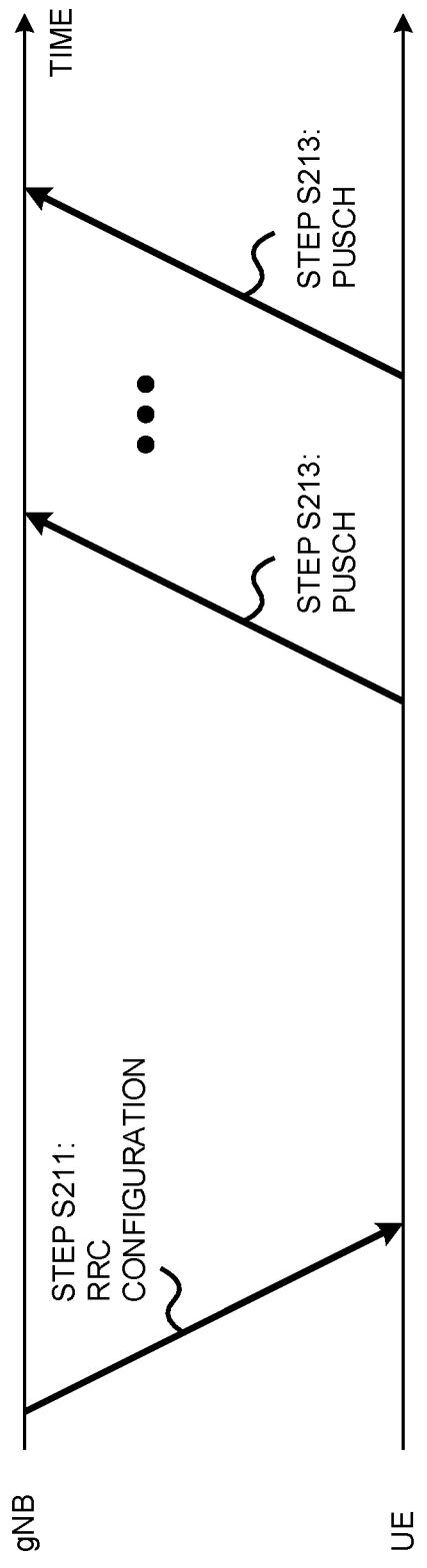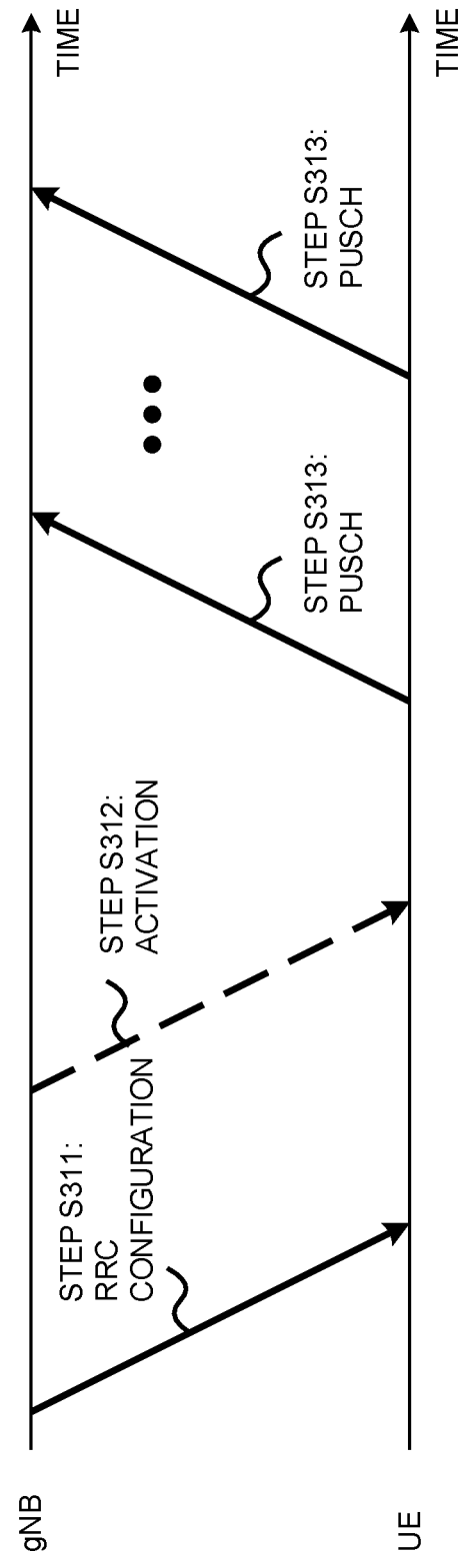

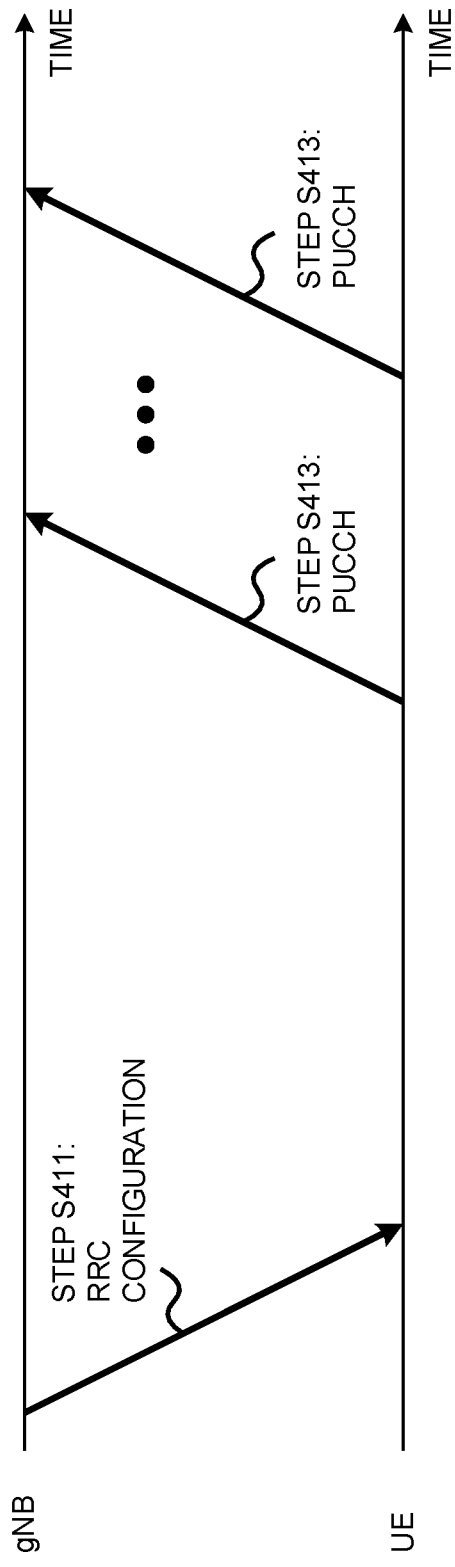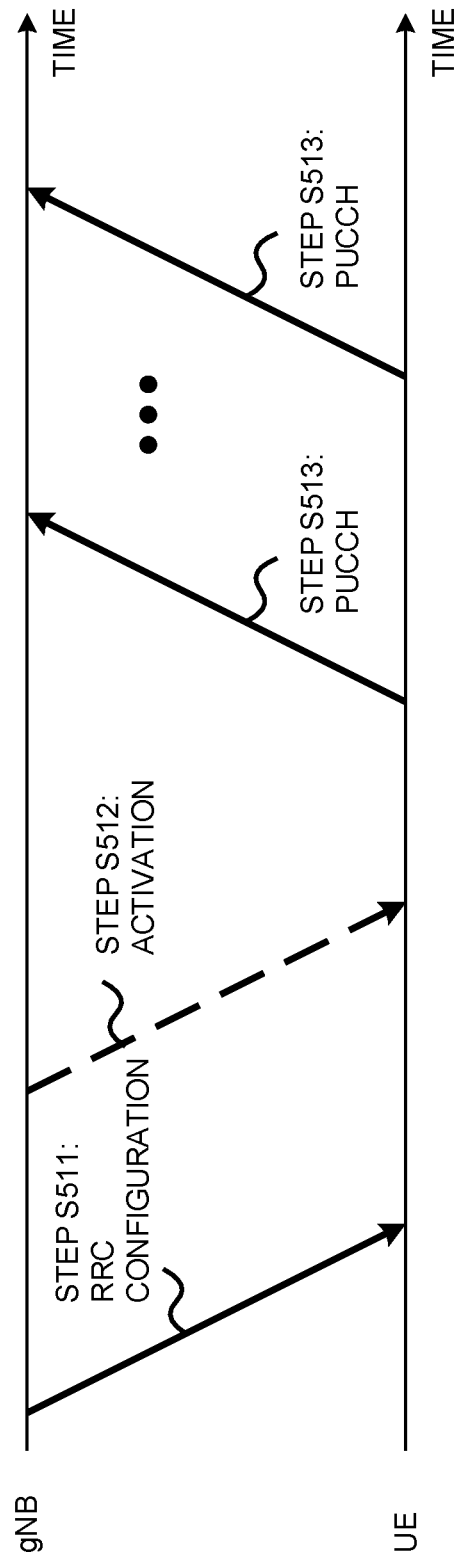

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 14," "LTE Rel. 15" (or later versions), and so on) are also under study.

In existing LTE systems (LTE Rel. 8 to Rel. 13), monitoring of radio link quality (RLM (Radio Link Monitoring)) is performed. When RLM leads to detection of a radio link failure (RLF), a user terminal (UE (User Equipment)) is requested to re-establish an RRC (Radio Resource Control) connection.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, LTE Rel. 14 or later versions, NR, or 5G), communication utilizing beam forming (BF) has been under study. For suppression of a possible radio link failure (RLF), implementing a procedure for switching to another beam (which may be referred to as beam failure recovery (BFR) and so on) in a case that quality of a specific beam deteriorates has been under study.

However, in a case that a radio resource used for the beam failure recovery procedure is inappropriate, problems may occur in that the user terminal fails to request beam failure recovery and that processing loads on the user terminal increase, for example.

In view of above, an object of the present disclosure is to provide a user terminal and a radio communication method that perform a beam failure recovery procedure by using an appropriate radio resource.

Solution to Problem

A user terminal according to an aspect of the present disclosure includes a transmitting section that transmits a beam failure recovery request and a control section that controls transmission of the beam failure recovery request by using at least one of an uplink shared channel, an uplink control channel, a sounding reference signal, and a random access channel indicated by a downlink control channel.

Advantageous Effects of Invention

According to an aspect of the present disclosure, a beam failure recovery procedure can be performed by using the appropriate radio resource.

BRIEF DESCRIPTION OF DRAWINGS

FIGS. 3A and 3B are diagrams to show a BFR request using a PUSCH;

FIGS. 4A and 4B are diagrams to show an example of the BFR request using the PUSCH;

DESCRIPTION OF EMBODIMENTS

Figure 1:
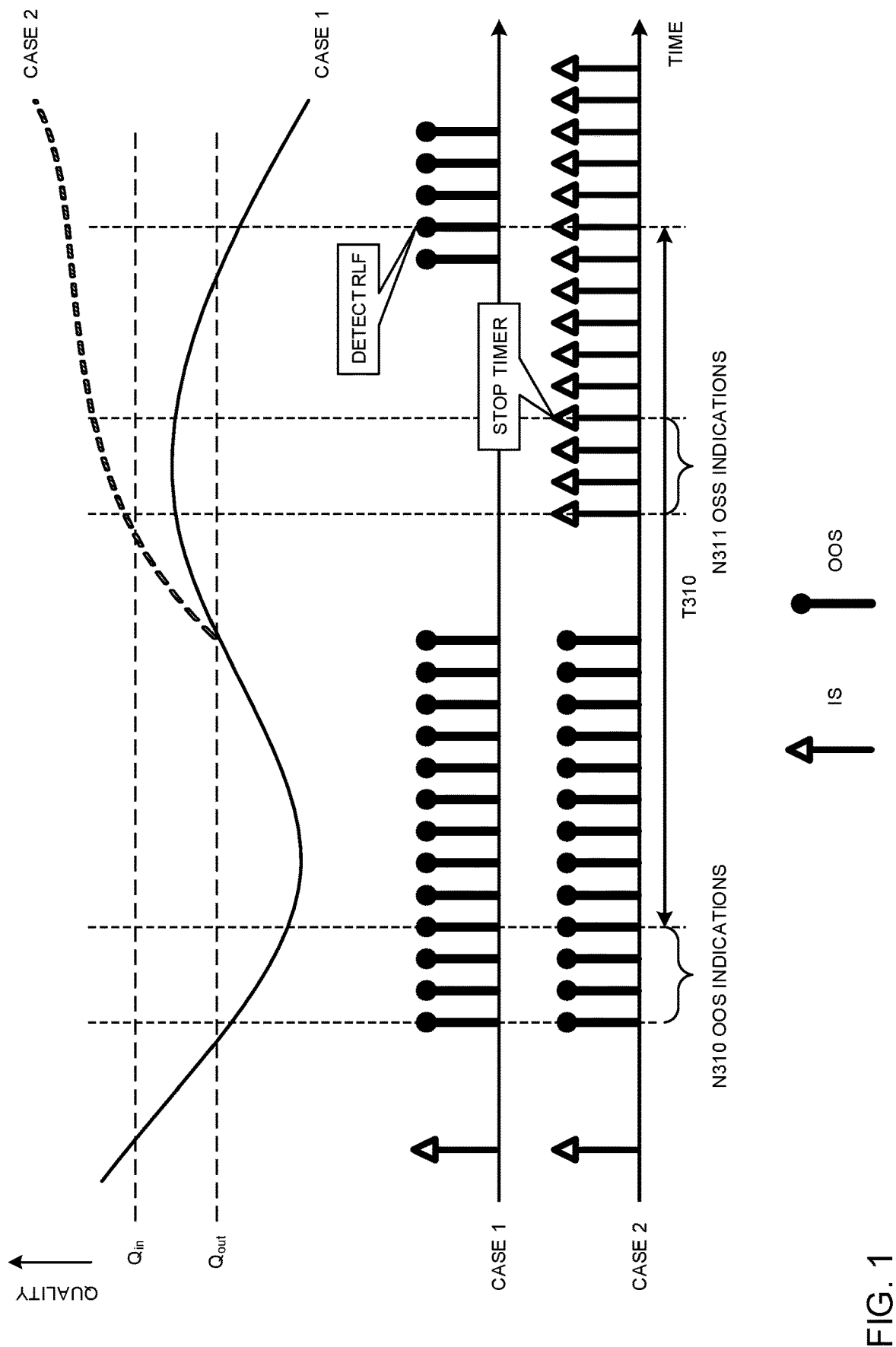
FIG. 1 is a schematic diagram of judgment of an RLF based on IS/OOS.

For future radio communication systems (for example, LTE Rel. 14 or later versions, NR, or 5G), communication utilizing beam forming (BF) has been under study.

For example, a user terminal and/or a radio base station (for example, gNB (gNodeB)) may use a beam used for transmission of signals (also referred to as a transmit beam, a Tx beam, and so on) and a beam used for reception of signals (also referred to as a receive beam, an Rx beam, and so on). A combination of the transmit beam on the transmitting side and the receive beam on the receiving side may be referred to as a beam pair link (BPL).

An environment using BF is likely to be affected by obstruction by an obstacle, and is thus assumed to suffer degradation of radio link quality. The degraded radio link quality may lead to frequent radio link failures (RLFs). An occurrence of RLF results in a need for reconnection of a cell, and thus frequent RLFs may degrade a system throughput.

Thus, for the future radio communication systems, a method for radio link monitoring (RLM) has been under discussion. For example, for the future radio communication systems, support of one or more downlink signals for RLM (also referred to as DL-RS (Reference Signal) and so on) has been under study.

Resources for DL-RS (DL-RS resources) may be associated with resources and/or ports for synchronization signal blocks (SSBs) or RSs for channel state measurement (CSI-RSs (Channel State Information RSs). Note that SSBs may be referred to as SS/PBCH (Physical Broadcast Channel) blocks and so on.

The DL-RS may be at least one of a primary synchronization signal (PSS (Primary SS)), a secondary synchronization signal (SSS: Secondary SS), a mobility reference signal (MRS (Mobility RS)), the CSI-RS, a tracking reference signal (TRS (Tracking RS)), a demodulation reference signal (DMRS), and a beam specific signal, for example, or a signal configured by extending and/or changing any of the above-described signals (for example, a signal configured by changing density and/or period).

For the user terminal, measurements using DL-RS resources may be configured by higher layer signaling. The user terminal configured with the measurement may be assumed to judge whether a radio link is In-Sync (IS) or Out-Of-Sync (OOS), based on the result of the measurement using the DL-RS resources. Default DL-RS resources may be specified on which the user terminal performs RLM in a case that the DL-RS resources are not configured by the radio base station.

The user terminal may judge a radio link to be IS in a case that the quality of the radio link estimated (this estimation may be referred to as measurement) based on at least one of the configured DL-RS resources is higher than a certain threshold (for example, $Q_{in}$).

The user terminal may judge a radio link to be OOS in a case that the quality of the radio link estimated based on at least one of the configured DL-RS resources is lower than a certain threshold (for example, $Q_{out}$). Note that the radio link qualities may correspond to, for example, a block error rate (BLER) of a hypothetical PDCCH.

The IS/OOS judged at regular periods (periodically) may be referred to as a periodic IS (P-IS)/periodic OOS (P-OOS). For example, the IS/OOS judged by using an RLM-RS may be P-IS/OOS.

In existing LTE systems (LTE Rel. 8 to Rel. 13), the IS and/or OOS (IS/OOS) is indicated from a physical layer to higher layers (for example, a MAC layer and an RRC layer) by the user terminal, and an RLF is judged based on the IS/OOS indication.

Specifically, in the case of receiving a certain number of (for example, N310) OOS indications for a certain cell (for example, a primary cell), the user terminal initiates (starts) a timer T310. In a case that N311 IS indications related to the certain cell are received during running of the timer T310, the timer T310 is stopped. In a case that the timer T310 expires, the user terminal judges that an RLF related to the certain cell has been detected.

Note that no limitation is intended for the designations such as N310, N311, and T310. T310 may be referred to as a timer for RLF detection and so on. N310 may be referred to as the number of OOS indications for initiation of the timer T310 and so on. N311 may be referred to as the number of IS indications for stoppage of the timer T310 and so on.

FIG. 1 is a schematic diagram of judgment of an RLF based on IS/OOS. In the present figure, N310=N311=4 is assumed. T310 represents a period from initiation until expiration of the timer T310, and does not indicate a counter for the timer.

An upper portion of FIG. 1 shows two cases (Case 1 and Case 2) of a change in estimated radio link quality. A lower portion of FIG. 1 shows IS/OOS indications corresponding to the above-described two cases.

In Case 1, first, OOS occurs N310 times, and this initiates the timer T310. Subsequently, the T310 expires without the radio link quality being higher than the threshold $Q_{in}$, leading to detection of an RLF.

In Case 2, the timer T310 is initiated as in Case 1, but the radio link quality exceeds the threshold $Q_{in}$ and the IS occurs N311 times, stopping the T310.

For future radio communication systems (for example, LTE Rel. 14 or later versions, NR, or 5G), for suppression of a possible RLF, studies have been conducted about implementing, in a case that a specific beam has degraded quality, a procedure for switching to another beam (which may be referred to as beam failure recovery (BFR), L1/L2 beam recovery, and so on).

An RLF is judged based on RS measurements in the physical layer and control of activation and expiration of the timer in the higher layers as described above, and recovery from the RLF requires a procedure equivalent to random access. On the other hand, for switching to another beam (BFR or L1/L2 beam recovery), the recovery from an RLF is expected to simplify the procedure in at least some layers. Note that the BFR procedure may be referred to as a BFR request procedure or a link reconfiguration procedures.

The BFR procedure may be triggered by a beam failure. Here, the beam failure may indicate that, for example, at a UE and/or a base station, detection of one or a plurality of control channels have not been detected or none of the control channels has been detected, for a certain period, or a measurement result for the reception quality of a reference signal associated with the control channel does not satisfy certain quality.

Figure 2:
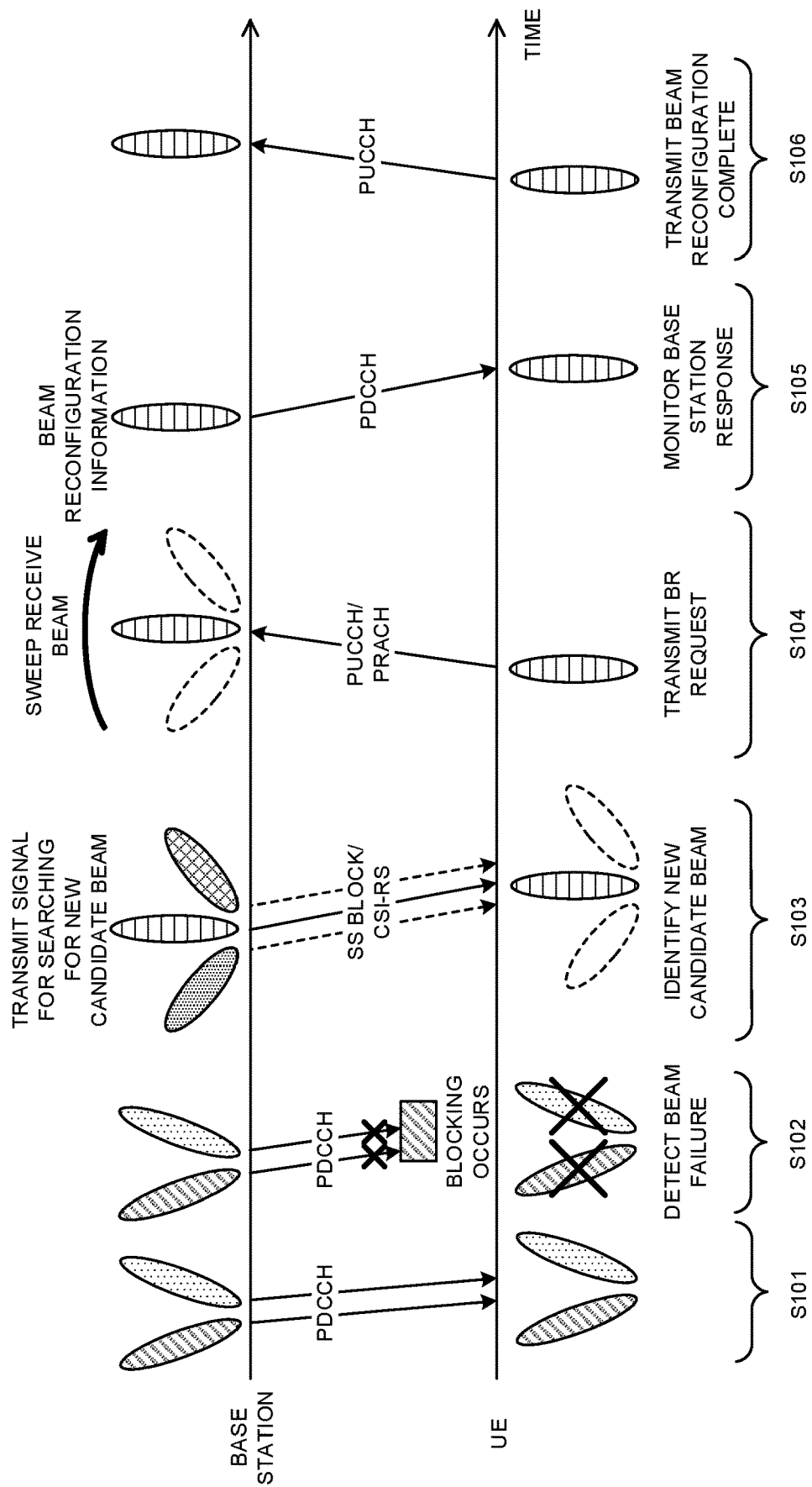
FIG. 2 is a diagram to show an example of a BFR procedure.

FIG. 2 is a diagram to show an example of the BFR procedure. The number of beams and the like is illustrative, and no such limitation is intended. In an initial state (step S101) in FIG. 2, the user terminal receives a downlink control channel (PDCCH (Physical Downlink Control Channel)) transmitted from the radio base station by using two beams.

In step S102, a radio wave from the radio base station is blocked to preclude the user terminal from detecting the PDCCH. Such blocking may be caused by, for example, an obstacle between the user terminal and the radio base station, fading, or interference.

The user terminal detects a beam failure when a certain condition is satisfied. For example, the certain condition is that measurement results for one or a plurality of pre-configured DL-RS resources are all smaller than a certain threshold $Q_{out\_LR}$. The lack of an indication from the user terminal may cause the radio base station to judge that the user terminal has detected a beam failure, or the radio base station may receive a certain signal (BFR request in step S104) from the user terminal to judge that a beam failure has been detected.

In step S103, for BFR, the user terminal starts searching for a new candidate beam for new use in communication. Specifically, when detecting a beam failure, the user terminal performs measurements based on pre-configured DL-RS resources to identify one or more preferred candidate beams (for example, having high quality). In the present example, one beam is identified as a new candidate beam.

In step S104, the user terminal that identifies the new candidate beam transmits a BFR request (BFR request signal, BFRQ). The BFR request may be transmitted by using, for example, a random access channel (PRACH (Physical Random Access Channel)).

For example, PRACH resources may be configured by higher layers (for example, RRC signaling). The PRACH resources may include a time resource, a frequency resource, a PRACH sequence, and so on.

The BFR request may include information regarding the new candidate beam identified in step S103. The PRACH resources for the BFR request may be associated with the new candidate beam. For example, one or a plurality of PRACH resources and/or sequences are configured for each of the new candidate beams, and the user terminal can determine the PRACH resource and/or sequence to be transmitted as a BFR request depending on the identified new candidate beam. Beam information may be indicated by using a beam index (BI), a port for a certain reference signal and/or a resource index (for example, a CSI-RS resource indicator (CRI)), and so on.

In step S105, the radio base station that detects the BFR request transmits a response signal (BFR request response (BFRQ response)) to a BFR request from the user terminal. The BFR request response may include reconfiguration information regarding one or a plurality of beams (for example, configuration information regarding the DL-RS resource). The BFR request response may be transmitted, for example, as a PDCCH in a user-specific search space or a PDCCH in a user terminal common search space. When detecting the response signal, the user terminal may recognize that BFR has succeeded. The user terminal may judge a transmit beam and/or receive beam to be used, based on beam reconfiguration information.

In step S106, the user terminal may transmit, to the radio base station, a message indicating that beam reconfiguration is completed. The message may be transmitted, for example, on a PUCCH.

BFR success refers to a case that, for example, step S106 has been reached. On the other hand, BFR failure refers to a case that step S106 is not reached (for example, a case that, in step S103, no candidate beam has been successfully identified, and so on).

This BFR procedure may not be able to use an appropriate radio resource. For example, the BFR procedure assumes the BFR request to be the PRACH. For example, the BFR procedure assumes recovery from a beam failure in the primary cell.

The inventors of the present invention came up with the idea of performing the BFR procedure by using the appropriate radio resource. For example, the inventors of the present invention came up with the idea that a user terminal transmits the BFR request by using at least one of a PDSCH (Physical Downlink Shared Channel), the PDCCH, an SRS (Sounding Reference Signal), and the PRACH ordered by the PDCCH (PDCCH-ordered PRACH). For example, the inventors of the present invention came up with a BFR procedure for a beam failure in a secondary cell.

Note that the primary cell (PCell) may be a special cell. In DC (Dual Connectivity), the special cell may be a PCell in an MCG (Master Cell Group) and a PSCell (Primary Secondary Cell) in an SCG (Secondary Cell Group). The secondary cell (SCell) may be any cell other than the special cell.

Embodiments according to the present disclosure will be described in detail with reference to the drawings. Aspects of the embodiments may be employed independently or may be employed in combination.

(First Aspect)

In a first aspect, a BFR request using at least one of the PUSCH, PUCCH, and SRS will be described.

Resources for at least one of the PUSCH, PUCCH, and SRS for the BFR request may be configured by the higher layers (for example, the RRC signaling). The UE can transmit the BFR request by using an appropriate radio resource.

In a case that the UE requests BFR, the UE may transmit at least one of the PUSCH, PUCCH, and SRS by using the configured resource.

The BFR request may use at least one of the following options 1-1 to 1-3.

<Option 1-1>

The BFR request may be transmitted by using the PUSCH.

A MAC CE (Control Element) and/or a MAC PDU (Protocol Data Unit) in the PUSCH indicating BFR (BFR requesting PUSCH) may include at least one of the following information 1, information 2, and information 3.

Information 1: Intra-cell UE-specific identifier (C-RNTI, Cell-Radio Network Temporary Identifier)

The BFR requesting PUSCH includes the C-RNTI, and thus the NW can recognize which UE has transmitted the BFR request corresponding to the received BFR requesting PUSCH.

Information 2: beam-related information

The beam-related information may be information related to a preferred beam for the UE. For example, the beam-related information may include at least one of a reference signal (DL-RS) identifier (RS ID) corresponding to the preferred beam, reference signal received power (RSRP) of the preferred beam or each beam, and reference signal received quality (RSRQ) of the preferred beam or each beam. The beam-related information may be allowed to be implicitly identified from the configured resource for the BFR requesting PUSCH. Specifically, BFR requesting PUSCH resources are configured in advance that correspond to respective candidate beams, and the UE transmits the BFR requesting PUSCH in the resource corresponding to the beam preferred for the UE.

The BFR requesting PUSCH includes the beam-related information or has a resource configuration for deriving the beam-related information, and thus the NW can appropriately perform beam reconfiguration.

Information 3: at least one of a buffer status report (BSR) indicating the amount of uplink data buffered in the UE and a power headroom report (PHR) indicating surplus transmission power of the UE.

The PUSCH structure may re-utilize a mechanism for UL transmission without UL grant. The UL transmission without UL grant may be referred to as UL grant-free transmission.

The PUSCH structure may re-utilize a mechanism for either type 1 UL transmission without UL grant or type 2 UL transmission without UL grant. Type 1 UL transmission is configured by the RRC signaling and performed without being configured by L1 signaling. Type 2 UL transmission is configured by the RRC signaling, and when activated or deactivated by the L1 signaling (for example, DCI), is performed without UL grant. Type 2 may also be referred to as semi-persistent scheduling (SPS).

The use of such a mechanism allows the UE to be configured with a PUSCH resource and to transmit the PUSCH without receiving UL grant.

In other words, as is the case with type 1 UL transmission without UL grant, the UE may be configured with a resource by the RRC signaling (S211) and may transmit the BFR requesting PUSCH by using the configured resource (S213) as in FIG. 3A. As is the case with type 2 UL transmission without UL grant, the UE may be configured with a resource by the RRC signaling (S311), and when the UL transmission is activated by the L1 signaling (S312), may transmit the BFR requesting PUSCH by using the configured resource until the UL transmission is deactivated by the L1 signaling (S313) as in FIG. 3B.

CORESET for the BFR request response (CORESET-BFR) may be configured for the UE by the higher layers (for example, the RRC signaling). The UE may monitor the PDCCH associated with the CORESET-BFR a certain time after the transmission of the BFR requesting PUSCH. For example, the UE may monitor the PDCCH associated with the CORESET-BFR four slots after the slot of transmission of the BFR requesting PUSCH.

The PDCCH associated with the CORESET-BFR may be a BFR request response or a retransmission request for the BFR requesting PUSCH. The UE may use a specific field in the PDCCH to identify whether the PDCCH corresponds to a BFR request response or a retransmission request for the BFR requesting PUSCH. The specific field may be, for example, an NDI (New Data Indicator).

In a case that the PDCCH corresponds to a retransmission request for the BFR requesting PUSCH, the UE retransmits the BFR request.

According to option 1-1, the BFR request can be transmitted by using the flexible transmission method, and the transmission of the BFR request re-utilizes the mechanism for UL transmission without UL grant, enabling simplification of the BFR procedure and allowing processing loads on the UE to be kept low.

<Option 1-2>

The BFR request may be transmitted by using the PUCCH.

A PUCCH resource for a scheduling request (SR) and/or a CSI report may be configured for the UE and used for the PUCCH for the BFR request (BFR requesting PUCCH).

In a case that the BFR requesting PUCCH uses the PUCCH resource for the SR, only whether a BFR request has been made or not is indicated, and thus the same operations can be employed as those performed in the case that the BFR request corresponds to the PRACH.

In a case of using the PUCCH resource for the CSI report, the BFR requesting PUCCH can include other information because BFR requesting PUCCH can transmit a plurality of bits.

The BFR requesting PUCCH may include at least one of the following information 1 and information 2.

Information 1: C-RNTI
Information 2: beam-related information

The beam-related information may be information related to the preferred beam for the UE. For example, the beam-related information may include at least one of the reference signal identifier (RS ID) corresponding to the preferred beam, the reference signal received power (RSRP), and the reference signal received quality (RSRQ). The beam-related information may be allowed to be implicitly identified from the configured resource for the BFR requesting PUCCH. Specifically, BFR requesting PUCCH resources are configured in advance that correspond to respective candidate beams, and the UE transmits the BFR requesting PUCCH in the resource corresponding to the beam preferred for the UE. The BFR requesting PUCCH includes the beam-related information or has a resource configuration for deriving the beam-related information, and thus the NW can appropriately perform beam reconfiguration.

The PUCCH structure may re-utilize a mechanism for P-CSI (Persistent-Channel State Information) or SP-CSI (Semi-persistent-CSI) that periodically performs CSI reporting.

In the P-CSI and the SP-CSI, a transmission period, a PUCCH resource for transmission, and the like are configured for the UE by the higher layers (for example, the RRC signaling). The UE configured with the P-CSI periodically transmits the CSI report. The UE configured with the SP-CSI periodically transmits the CSI report during a period from activation until deactivation of the SP-CSI.

The use of such a mechanism allows the UE to transmit the BFR request by using PUCCH resources.

In other words, as is the case with the P-CSI, the UE may be configured with a PUCCH resource by the RRC signaling (S411) and may periodically transmit the BFR requesting PUCCH by using the configured PUCCH resource (S413) as in FIG. 4A. As is the case with the SP-CSI, the UE may be configured with a PUCCH resource by the RRC signaling (S511), and when the PUCCH transmission is activated (S512), may periodically transmit the BFR requesting PUCCH by using the resource until the PUCCH transmission is deactivated (S513) as in FIG. 4B. The activation of the PUCCH transmission may be performed by the DCI carried by the PDCCH or by the MAC CE carried by the PDSCH.

The UE may monitor the PDCCH associated with the CORESET-BFR a certain time after the transmission of the BFR requesting PUCCH. For example, the UE may monitor the PDCCH associated with the CORESET-BFR four slots after the slot of transmission of the BFR requesting PUCCH.

According to option 1-2, the BFR request can be transmitted by using the flexible transmission method, and the transmission of the BFR request re-utilizes the mechanism for transmission of the CSI report in the P-CSI or the SP-CSI, enabling simplification of the BFR procedure and allowing processing loads on the UE to be kept low.

<Option 1-3>

The BFR request may be transmitted by using the SRS.

In the BFR procedure, the UE transmits the SRS as a BFR request. In this case, in the BFR procedure using, as a BFR request, the PRACH as shown in FIG. 2, it is only required that the PRACH is replaced with the SRS, with no other change needed.

According to option 1-3, the BFR request can be transmitted by using the flexible transmission method, and the BFR procedure can be simplified, allowing processing loads on the UE to be kept low.

Any one of options 1-1 to 1-3 described above may be applied not only to the BFR request for a beam failure in the PCell but also to the BFR request for a beam failure in the SCell. The UE uses may use any one of options 1-1 to 1-3 to transmit the BFR request in the PCell or to transmit the BFR request in the SCell.

(Second Aspect)

In a second aspect, the BFR in the secondary cell (SCell) will be described. Even in a case that a beam failure occurs in the secondary cell, the UE can transmit the BFR request by using an appropriate radio resource.

The BFR procedure may use at least one of the following options 2-1 and 2-2.

<Option 2-1>

The UE may initiate the BFR procedure.

As is the case with the BFR procedure in the primary cell (PCell) as in FIG. 2 described above, when the PHY (physical) layer in the UE detects a beam failure in the SCell, a need for the BFR in the SCell may be indicated to the MAC (Medium Access Control) layer (the BFR is declared to the MAC layer). In this case, the MAC layer in the UE may trigger the BFR request transmission, and the PHY layer in the UE may transmit the BFR request. The UE may use the PCell to transmit the BFR request or may use the SCell to transmit the BFR request.

According to option 2-1, the UE can detect a beam failure in the SCell and perform the BFR procedure for the SCell.
<Option 2-2>

The NW (network, for example, the radio base station) may initiate the BFR procedure. The UE is connected to the PCell, and thus the NW can initiate the BFR procedure for the SCell.

The NW may receive a report of the beam-related information for the SCell from the UE and recognize a beam failure based on the information. The report of the beam-related information may be transmitted from the UE by using the PUCCH or the PUSCH, or the NW may detect that no feedback is provided for the PDSCH scheduled or no PUSCH scheduled with time intervals and/or the number of times has been transmitted, to recognize a beam failure in the SCell. When recognizing a beam failure, the NW may judge the need for the BFR procedure for the SCell.

Such operations allow the NW to trigger the BFR procedure for the SCell.

Figure 5:
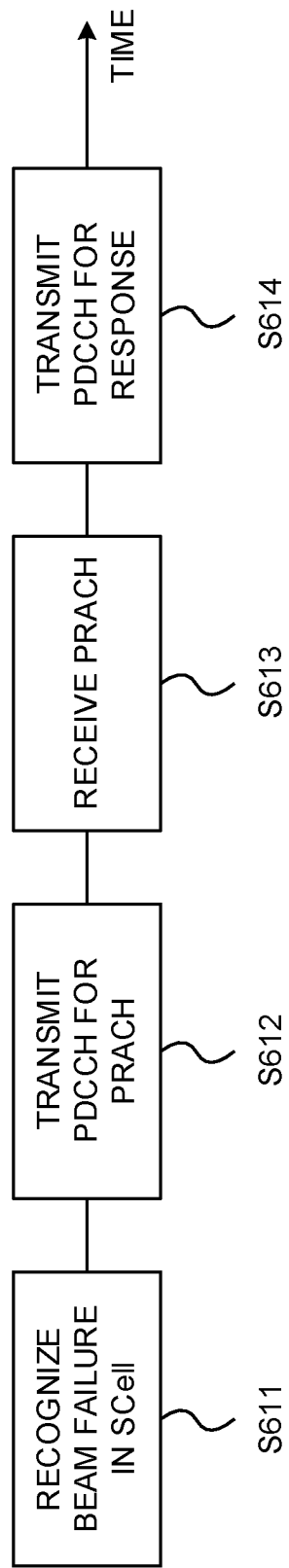
FIG. 5 is a diagram to show an example of a BFR procedure initiated by an NW.

As illustrated in FIG. 5, in a case of recognizing a beam failure in the SCell and judging the need for the BFR procedure in the SCell (S611), the NW may transmit, in the PCell, the PDCCH for triggering a PDCCH-ordered PRACH transmission, to the UE (S612). In this case, the UE is requested by the PDCCH to transmit the PRACK in the SCell as is the case with contention-free random access (CFRA). For example, when receiving, in the PCell, the PDCCH for triggering, the UE uses a dedicated PRACH resource configured for the UE by the higher layers (for example, the RRC signaling) in advance to perform, in the SCell, the PRACH transmission for the BFR.

When receiving the PRACH (S613), the NW may transmit the PDCCH indicating the BFR request response (S614). After the transmission of the PRACH for the BFR in the SCell, the UE monitors the PDCCH associated with the CORESET-BFR. The CORESET-BFR may be configured for the SCell in which the BFR request has been transmitted or for any other serving cell including the PCell.

According to option 2-2, the NW can recognize a beam failure in the SCell and perform the BFR procedure for the SCell.

In each of options 2-1 and 2-2, any one of options 1-1 to 1-3 may be employed. In other words, as the BFR request, instead of or in addition to the PRACH, at least one of the PUSCH, the PUCCH, and the SRS may be used.

(Radio Communication System)

Hereinafter, a structure of a radio communication system according to the present embodiment will be described. In this radio communication system, a combination of at least one of the plurality of aspects described above is used for communication.

Figure 6:
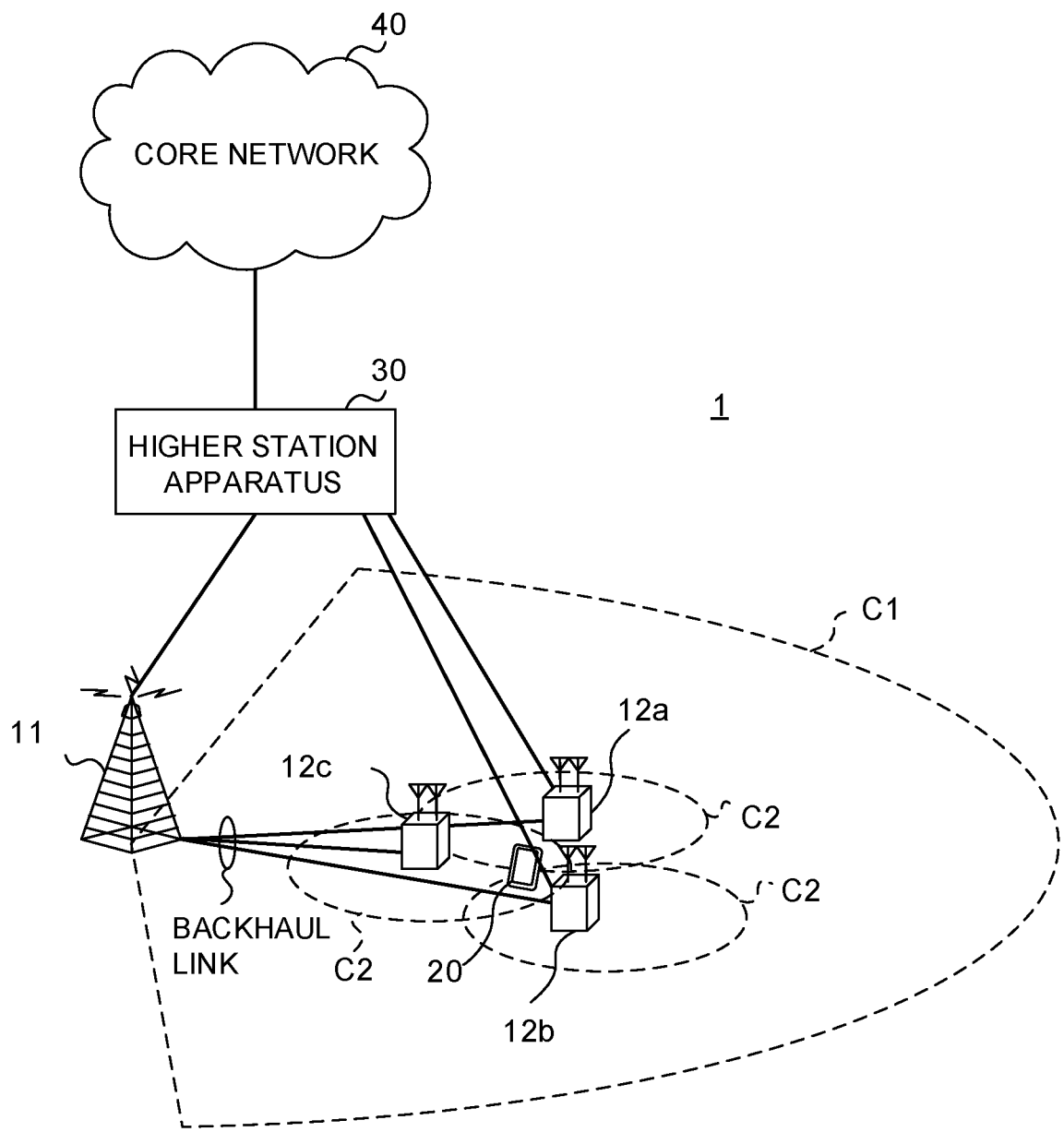
FIG. 6 is a diagram to show an example of a schematic structure of a radio communication system according to the present embodiment.

FIG. 6 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may employ CA or DC by using a plurality of cells (CCs) (for example, five or less CCs or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. In each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, filter processing, windowing processing, and so on.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include at least one of a downlink control channel (a PDCCH (Physical Downlink Control Channel)) and/or an EPDCCH (Enhanced Physical Downlink Control Channel), a PCFICH (Physical Control Format Indicator Channel), and a PHICH (Physical Hybrid-ARQ Indicator Channel). Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. Radio link quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 7:
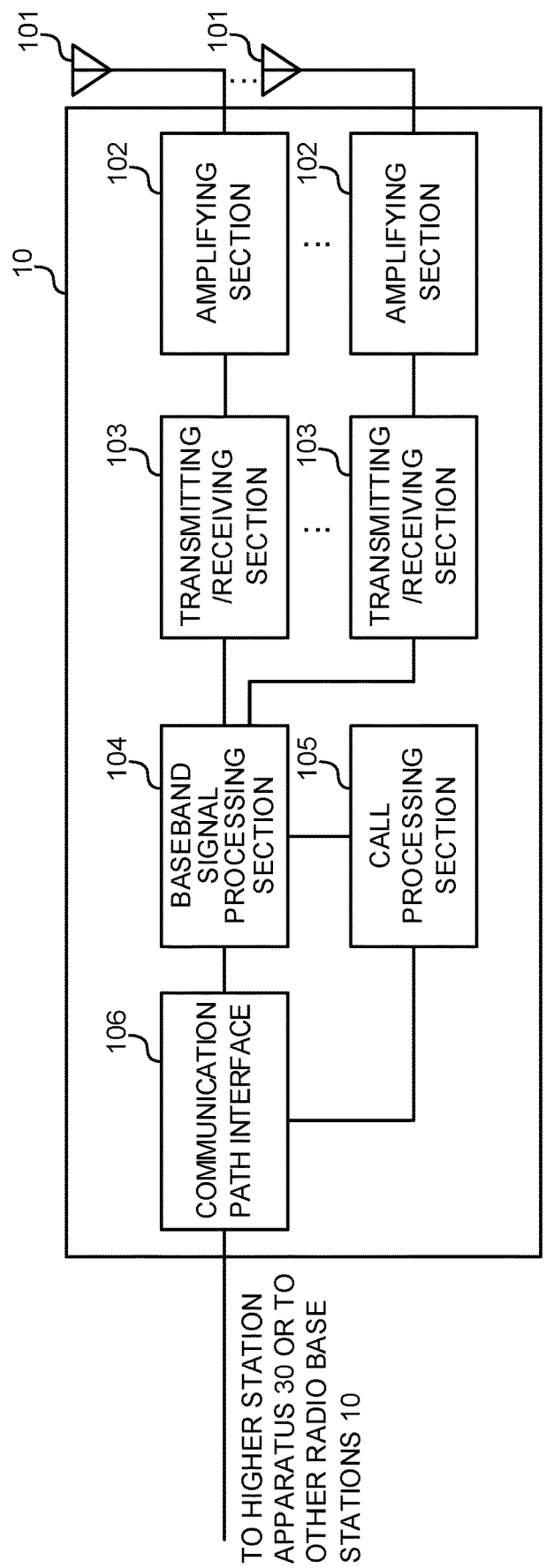
FIG. 7 is a diagram to show an example of an overall structure of a radio base station according to the present embodiment.

FIG. 7 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

Note that each transmitting/receiving section 103 may further include an analog beam forming section that implements analog beam forming. The analog beam forming section can be constituted with analog beam forming circuits (for example, phase shifters or phase shift circuits) or analog beam forming apparatus (for example, a phase shifter) that can be described based on general understanding of the technical field to which the present invention pertains. The transmitting/receiving antenna 101 can be constituted with, for example, an array antenna. The transmitting/receiving section 103 is configured to be able to employ single BF or multi BF.

The transmitting/receiving section 103 may transmit signals by using a transmit beam or may receive signals by using a receive beam. The transmitting/receiving section 103 may transmit and/or receive signals by using a certain beam determined by the control section 301.

The transmitting/receiving section 103 may receive the beam failure recovery request (for example, the BFR request) or may transmit the response to the beam failure recovery request (for example, the BFR request response).

Figure 8:
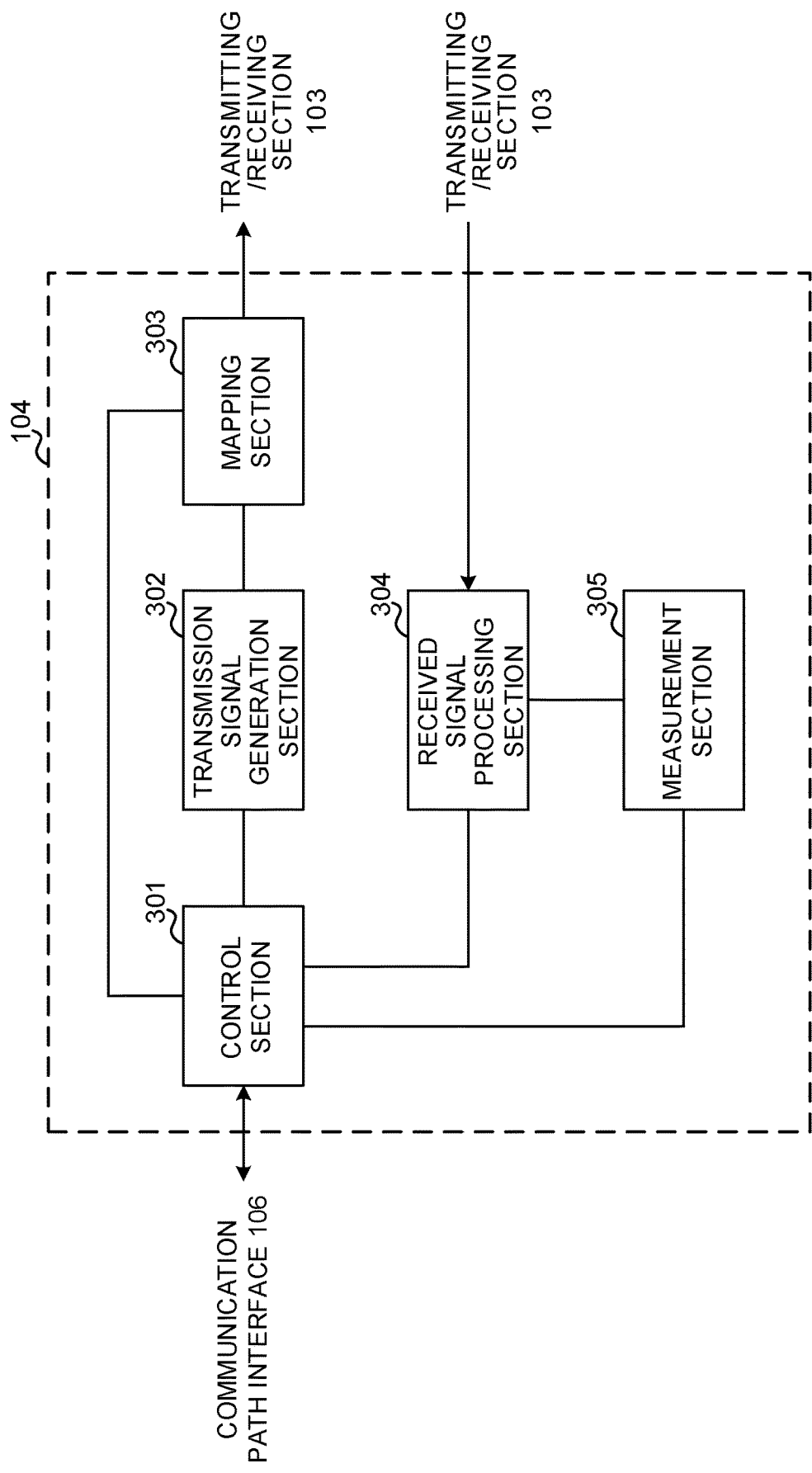
FIG. 8 is a diagram to show an example of a functional structure of the radio base station according to the present embodiment.

FIG. 8 is a diagram to show an example of a functional structure of the radio base station according to the present embodiment. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS/SSS), a downlink reference signal (for example, CRS, CSI-RS, DMRS), and so on.

The control section 301 may use digital BF by the baseband signal processing section 104 (for example, precoding) and/or analog BF by the transmitting/receiving sections 103 (for example, phase rotation) to perform control for forming a transmit beam and/or a receive beam.

The control section 301 may control radio link monitoring (RLM) and/or beam recovery (BR) for the user terminal 20.

The control section 301 may control the BFR in accordance with the BFR request.

The control section 301 may recognize a beam failure, based on communication with the user terminal 20. The control section 301 may control random access of the user terminal 20 (for example, PDCCH-ordered PRACH).

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing, modulation processing, and so on are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

<User Terminal>

Figure 9:
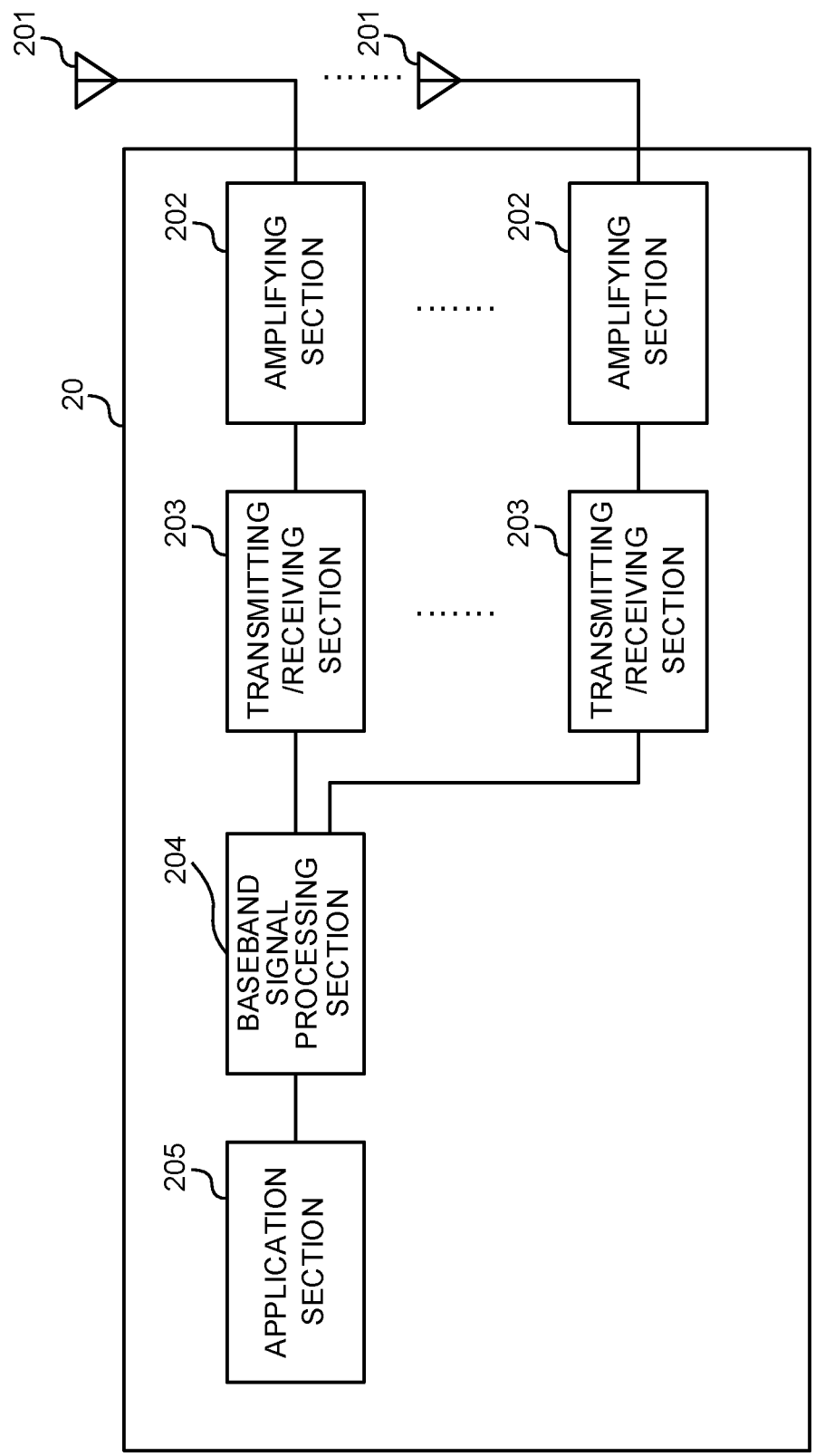
FIG. 9 is a diagram to show an example of an overall structure of a user terminal according to the present embodiment.

FIG. 9 is a diagram to show an example of an overall structure of a user terminal according to the present embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that each transmitting/receiving section 203 may further include an analog beam forming section that implements analog beam forming. The analog beam forming section can be constituted with analog beam forming circuits (for example, phase shifters or phase shift circuits) or analog beam forming apparatus (for example, a phase shifter) that can be described based on general understanding of the technical field to which the present invention pertains. The transmitting/receiving antenna 201 can be constituted with, for example, an array antenna. The transmitting/receiving section 203 is configured to be able to employ single BF or multi BF.

The transmitting/receiving section 203 may transmit signals by using a transmit beam or may receive signals by using a receive beam. The transmitting/receiving section 203 may transmit and/or receive signals by using a certain beam determined by the control section 401.

In a case of detecting a beam failure, the transmitting/receiving section 203 may transmit the beam failure recovery request (for example, the BFR request) or may receive the response to the beam failure recovery request (for example, the BFR request response).

Figure 10:
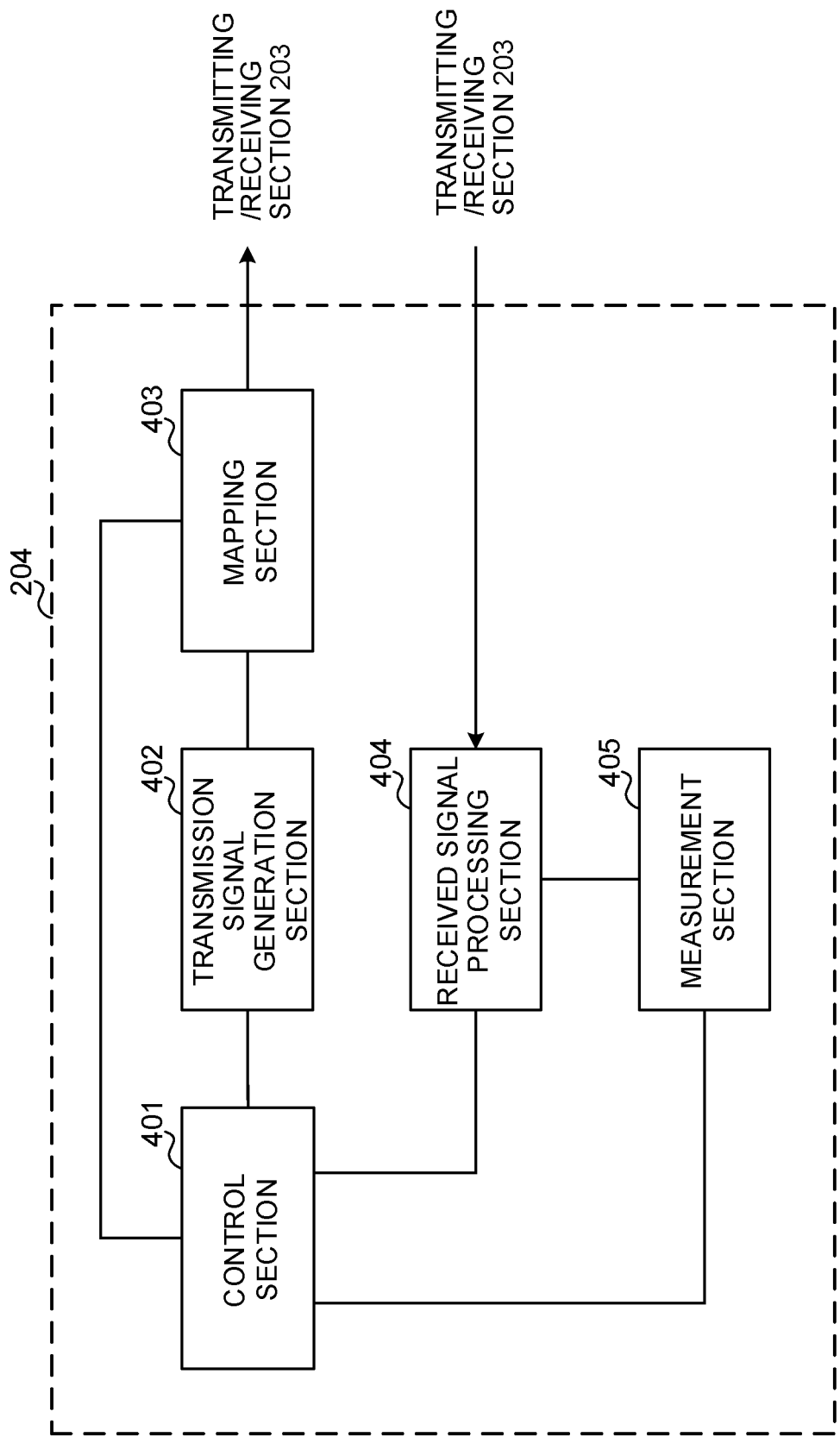
FIG. 10 is a diagram to show an example of a functional structure of a user terminal according to the present embodiment.

FIG. 10 is a diagram to show an example of a functional structure of a user terminal according to the present embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may use digital BF by the baseband signal processing section 204 (for example, precoding) and/or analog BF by the transmitting/receiving sections 203 (for example, phase rotation) to perform control for forming a transmit beam and/or a receive beam.

The control section 401 may control the radio link monitoring (RLM) and/or beam recovery (BR), based on the measurement results from the measurement section 405.

The control section 401 may control transmission of the beam failure recovery request (for example, the BFR request) by using at least one of the uplink shared channel (for example, the PUSCH), the uplink control channel (for example, the PUCCH), the sounding reference signal (for example, the SRS), and the random access channel indicated by the downlink control channel (for example, the PDCCH-ordered PRACH) (options 1-1 to 1-3 of the first aspect and option 2-2 of the second aspect).

The beam failure recovery request may indicate the request for the beam failure recovery in the secondary cell (second aspect).

The control section 401 may control the transmission of the beam failure recovery request in accordance with reception of the downlink control channel in the primary cell (second aspect, option 2-2).

The control section 401 may control the transmission of the beam failure recovery request by using at least one of the mechanisms for the uplink transmission scheduled by a higher layer, periodic channel state information report, and the semi-persistent channel state information report (first aspect, options 1-1 and 1-2).

The beam failure recovery request may include at least one of the identifier of the user terminal (for example, the C-RNTI), the information related to the preferred beam (for example, the beam-related information), the buffer status report (for example, the BSR), and the power headroom report (for example, the PHR).

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

<Hardware Structure>

Note that the block diagrams that have been used to describe the above present embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 11:
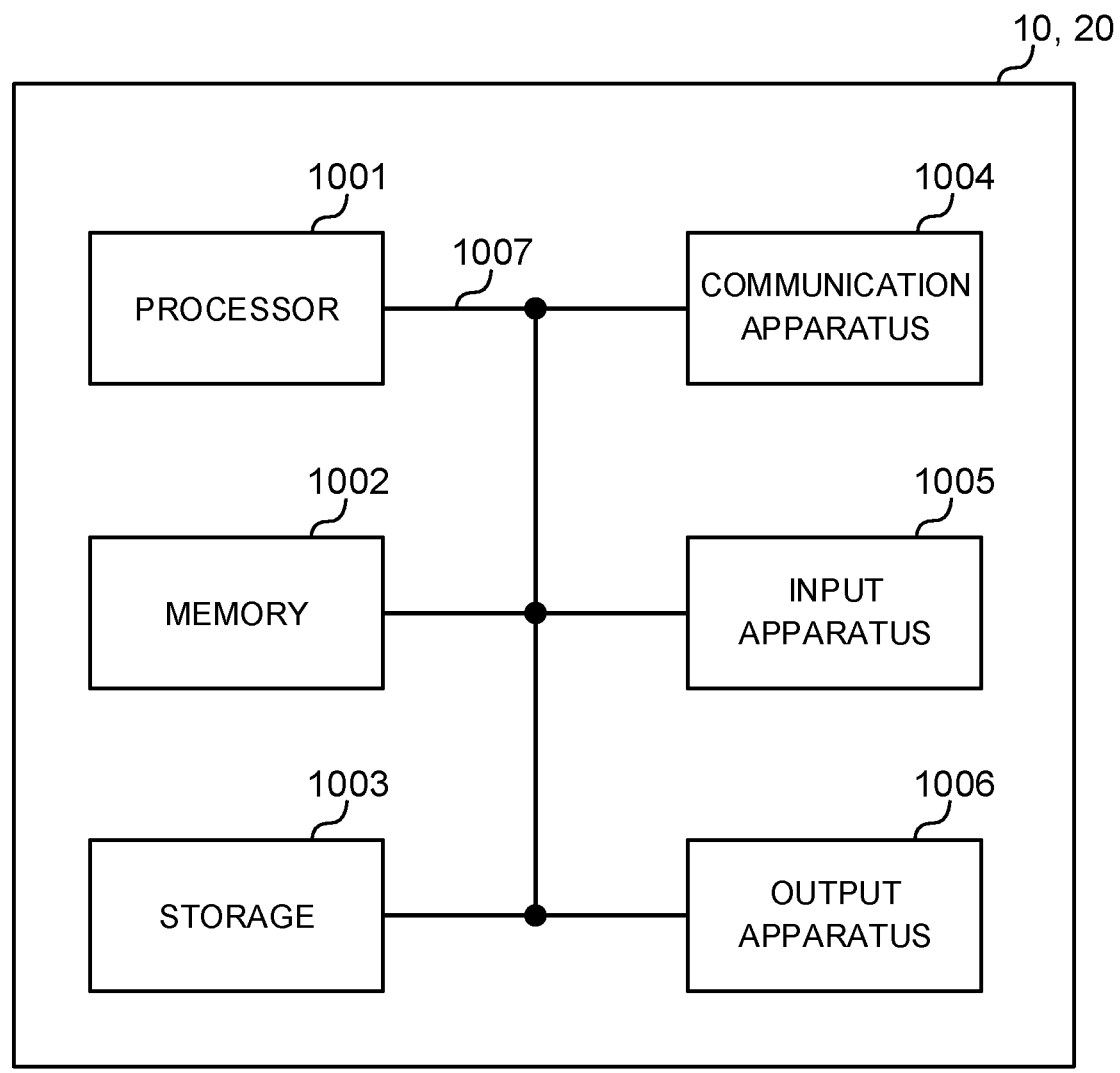
FIG. 11 is a diagram to show an example of a hardware structure of the radio base station and the user terminal according to the present embodiment.

For example, a radio base station, a user terminal, and so on according to the present embodiment of the present disclosure may function as a computer that executes the processes of the aspects of the present embodiment. FIG. 11 is a diagram to show an example of a hardware structure of the radio base station and the user terminal according to the present embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described present embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and/or the like for implementing a radio communication method according to the present embodiment.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in a case that one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/present embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/present embodiment of the present disclosure may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/present embodiments illustrated in this specification may be used individually or in combinations, which may be switched depending on the mode of implementation. The order of processes, sequences, flowcharts, and so on that have been used to describe the aspects/present embodiments herein may be re-ordered as long as inconsistencies do not arise. For example, although various methods have been illustrated in this specification with various components of steps in exemplary orders, the specific orders that are illustrated herein are by no means limiting.

The aspects/present embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the present embodiments described in this specification. The present invention can be implemented with various corrections and in various modifications, without departing from the spirit and scope of the invention defined by the recitations of claims. Consequently, the description in this specification is provided only for the purpose of explaining examples, and should by no means be construed to limit the invention according to the present invention in any way.

What is claimed is:

1. A terminal comprising:
    a processor that detects a beam failure in a secondary cell; and
    a transmitter that transmits a beam failure recovery request by using a scheduling request (SR), applicable for beam failure recovery on the secondary cell, on a physical uplink control channel, based on a configuration of the physical uplink control channel for the beam failure recovery by higher layer signaling, and transmits on a physical uplink shared channel, a Medium Access Control Control Element (MAC CE) including a reference signal ID corresponding to a candidate beam.

2. The terminal according to claim 1, wherein the transmitter transmits the beam failure recover request in a primary cell or a primary secondary cell.

3. A radio communication method for a terminal, comprising:
    detecting a beam failure in a secondary cell;
    transmitting a beam failure recovery request by using a scheduling request (SR), applicable for beam failure recovery on the secondary cell, on a physical uplink control channel, based on a configuration of the physical uplink control channel for the beam failure recovery by higher layer signaling; and
    transmitting on a physical uplink shared channel, a Medium Access Control Control Element (MAC CE) including a reference signal ID corresponding to a candidate beam.

4. A system comprising a terminal and a base station, wherein
    the terminal comprises:
        a processor that detects a beam failure in a secondary cell; and
        a transmitter that transmits a beam failure recovery request by using a scheduling request (SR), applicable for beam failure recovery on the secondary cell, on a physical uplink control channel, based on a configuration of the physical uplink control channel for the beam failure recovery by higher layer signaling, and transmits on a physical uplink shared channel, a Medium Access Control Control Element (MAC CE) including a reference signal ID corresponding to a candidate beam, and
    the base station comprises:
        a receiver that receives the beam failure recovery request and the MAC CE.

* * * * *